United States Patent [19]

Dutka et al.

[11] Patent Number: 5,579,632
[45] Date of Patent: Dec. 3, 1996

[54] OVERSPEED GOVERNOR CONTROL SYSTEM

[75] Inventors: Martin J. Dutka, South Bend; Rick L. Poelstra, Granger; Timothy F. Wiegand, South Bend; Paul W. Futa, Jr., North Liberty, all of Ind.

[73] Assignee: AlliedSignal Inc., Morristown, N.J.

[21] Appl. No.: 419,338

[22] Filed: Apr. 10, 1995

[51] Int. Cl.⁶ ...................................................... F02C 9/28
[52] U.S. Cl. ........................................... 60/39.281; 60/243
[58] Field of Search ................................... 60/39.281, 243

[56] References Cited

U.S. PATENT DOCUMENTS

| | | | |
|---|---|---|---|
| 3,808,801 | 5/1974 | Taylor | 60/39.281 |
| 4,716,723 | 1/1988 | Ralston et al. | 60/39.281 |
| 4,738,597 | 4/1988 | d'Agostino et al. | 60/39.281 |
| 4,817,376 | 4/1989 | Brocard et al. | 60/39.281 |
| 4,835,969 | 6/1989 | Tallman | 60/39.281 |

*Primary Examiner*—Louis J. Casaregola
*Attorney, Agent, or Firm*—Leo H. McCormick, Jr.; Larry J. Palguta

[57] ABSTRACT

A mechanical governor for use in a fuel management system having a fuel metering loop responsive to an electronic computer for supplying fuel to a combustion chamber of a turbine. The mechanical governor includes a cylindrical spinning spool valve assembly located in a bore which is responsive to an operational force derived from the rotation of the turbine. In a first mode of operation, communication of control pressure $P_c$ to an integrator valve assembly is inhibited by a first spring associated with the spool valve assembly while in a second mode of operation communication of an operational fluid pressure $P_x$ derived from the control pressure $P_c$ is communicated to the integrator valve assembly after an operational force corresponding to the rotation overcomes the first spring. In the first and second modes of operation, fuel is supplied to the combustion chamber as a function of a pressure differential across the fuel metering loop. Movement of the spool valve assembly is opposed and fuel is supplied to the combustion chamber under the first and second modes of operation until an operational force overcomes a second spring and the pressure differential across the fuel metering loop is lowered to reduce the fuel supplied to the combustion chamber and correspondingly the rotation of the turbine to prevent an over speed condition.

12 Claims, 4 Drawing Sheets

OVERSPEED GOVERNOR CONTROL SYSTEM

This invention relates to an overspeed governor control for use in a fuel management system to prevent damage to a turbine under certain rotational speed conditions.

Every turbine engine has an optimum fuel to air ratio for the most effective and efficient thrust under varying operational conditions. It is common in a fuel management system to include a mechanical governor which functions in support of an electronically controlled fuel metering loop, consisting of an electrohydraulic servovalve that regulates control fluid to a fuel metering loop including a fuel metering valve with an electronic resolver attached for positional feedback, such as disclosed in U.S. Pat. No. 4,245,462, through which fuel is supplied to a turbine. The metering loop receives an operational input from an electronic sensing and signal computer, which receives inputs from the resolver and other sensors relating to the operational conditions currently experienced by the turbine engine such as engine speed, power lever position, compressor inlet air temperature, altitude and other engine variables.

Rotation of the turbine in an engine is basically a function of the fuel supplied from the fuel metering loop. Most turbines are designed to operate within a set rotational range but can rotate above this range for a short time period when additional thrust is needed to meet certain operational conditions. It has been observed that an electrical error signal supplied to the computer may under certain conditions result in more fuel being supplied to a combustion chamber for a longer time period than may be beneficial for the overall optimum operation of the turbine. Since the amount of fuel supplied to a combustion chamber essentially controls the turbine speed, in order to protect the turbine, mechanical governors such as disclosed in U.S. Pat. Nos. 4,835,969 and 4,837,697 limit the amount of fuel supplied to a combustion chamber as a function of the rotational speed of the turbine.

The mechanical governors disclosed in U.S. Pat. Nos. 4,835,969 and 4,837,697 function in an adequate manner to protect a turbine from overspeed conditions, however the operational cam, related levers and valves associated therewith include numerous parts that results in a costly component.

An advantage in the present invention resides in the exclusive use of a rotating spool valve assembly and an integrator valve assembly and the exclusion of a cam, related levers and valves in the mechanical governor of the prior art. A rotating flyweight mechanism responsive to the rotation of the turbine acts on and moves the spool valve assembly to communicate control fluid to the integrator valve assembly. The movement of the spool is opposed by first and second springs which sequentially allow the communication of control fluid to the integrator valve assembly which overrides controls for maintaining a fixed pressure differential across a fuel metering loop. Thus, the operational fuel supplied to a combustion chamber is correspondingly reduced as a function of a reduction in the differential fluid pressure across the fuel metering loop such that an overspeed condition in said turbine is prevented without a change in an input to operate the metering loop.

It is an object of this invention to provide a fuel management system with an mechanical governor where an overspeed rotation of a turbine is prevented by lowering the pressure of a control fluid acting on a bypass valve which controls the fuel supplied to a fuel metering loop through which fuel is supplied to a combustion chamber.

It is a further object of this invention to provide a fuel management system with a mechanical governor which overrides an electronic input to a metering loop to reduce the fuel supplied to a combustion chamber and thereby maintain the rotation of a turbine within set limits to prevent an overspeed condition.

The advantages and objects of this invention should be apparent from reading this specification while viewing the drawings.

Figure 4:
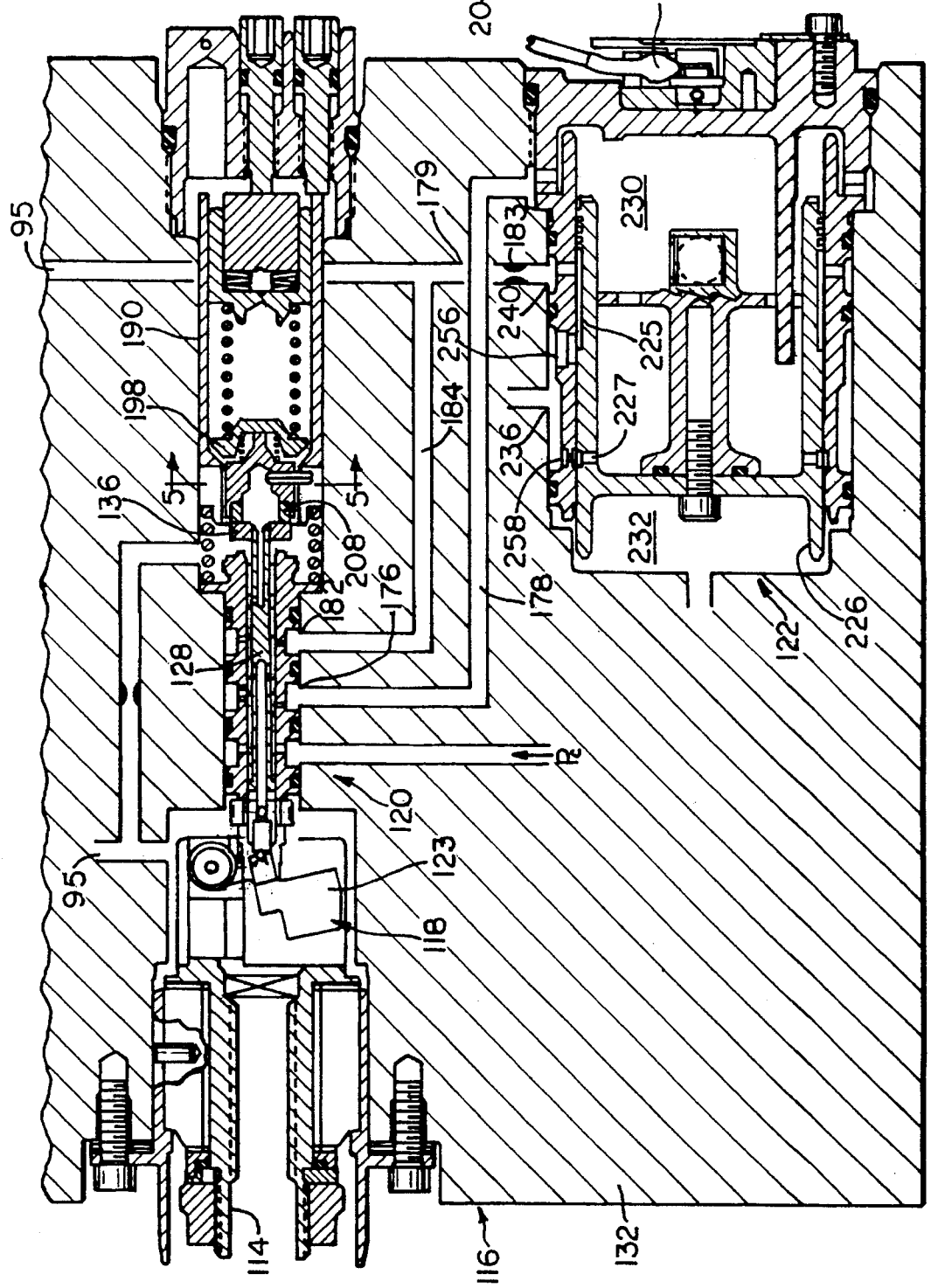

FIG. 4 is an enlarged view of the mechanical governor in a third mode of operation wherein the force developed in the flyweight as a result of rotation of the turbine corresponding to an overspeed rotation has moved the spool valve assembly to communicate control fluid to the integrator valve assembly and the integrator valve assembly has moved to reduce control fluid communicated to components that maintain a fixed pressure differential across the fuel metering loop resulting in a reduced pressure differential such that the fuel supplied to the combustion chamber is correspondingly reduced.

Figure 3:
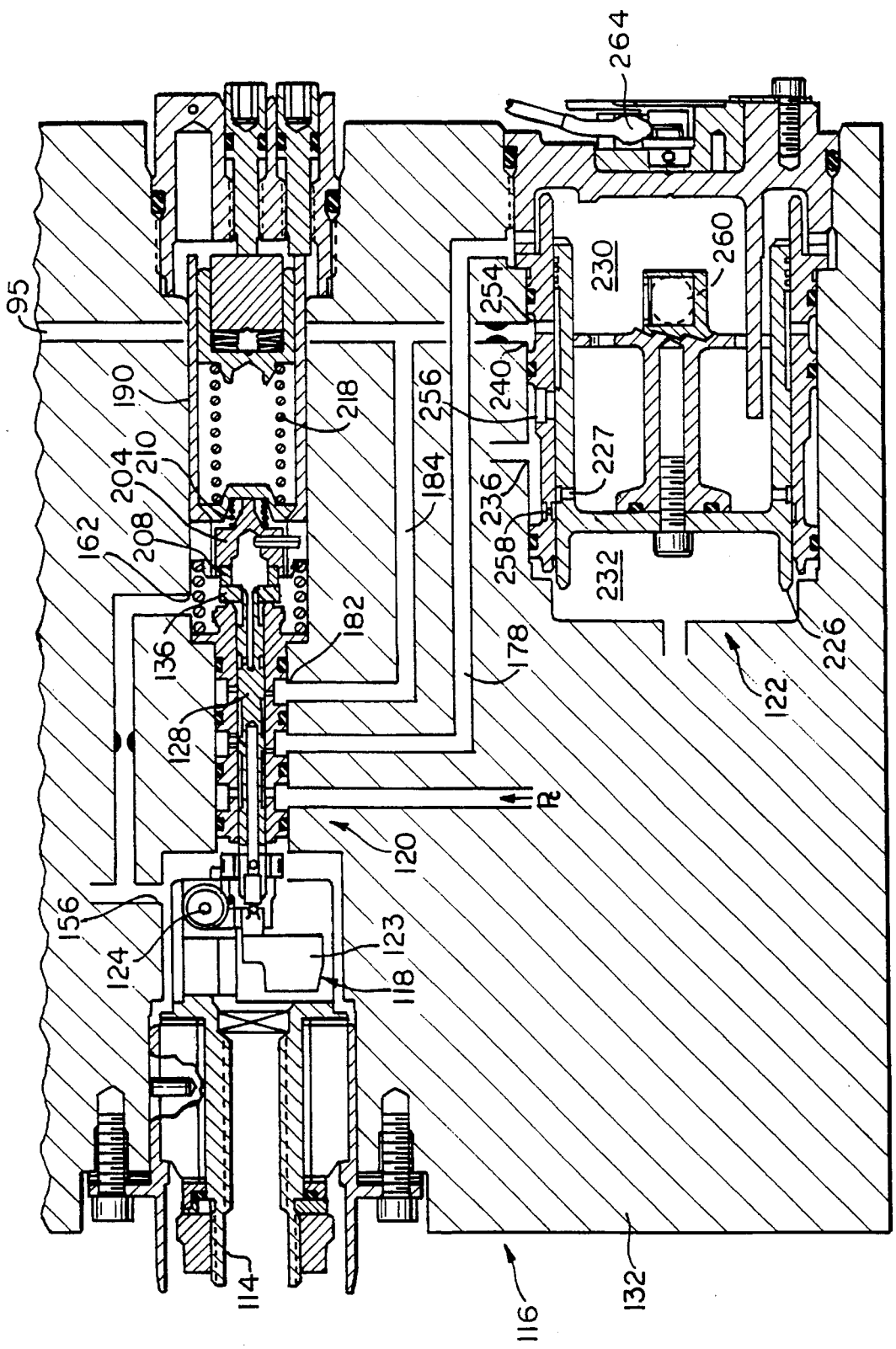
FIG. 3 is an enlarged view of the mechanical governor in a first mode of operation wherein the force developed in the flyweight as a result of rotation of the turbine has initially moved the spool valve assembly to communicate control fluid to the integrator valve assembly.
Figure 5:
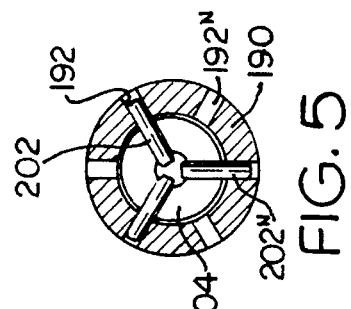

FIG. 5 is a sectional view taken along line 5—5 of FIG. 3 showing the relationship between a bearing retainer and locating sleeve in the slidable spool valve assembly.

Figure 1:
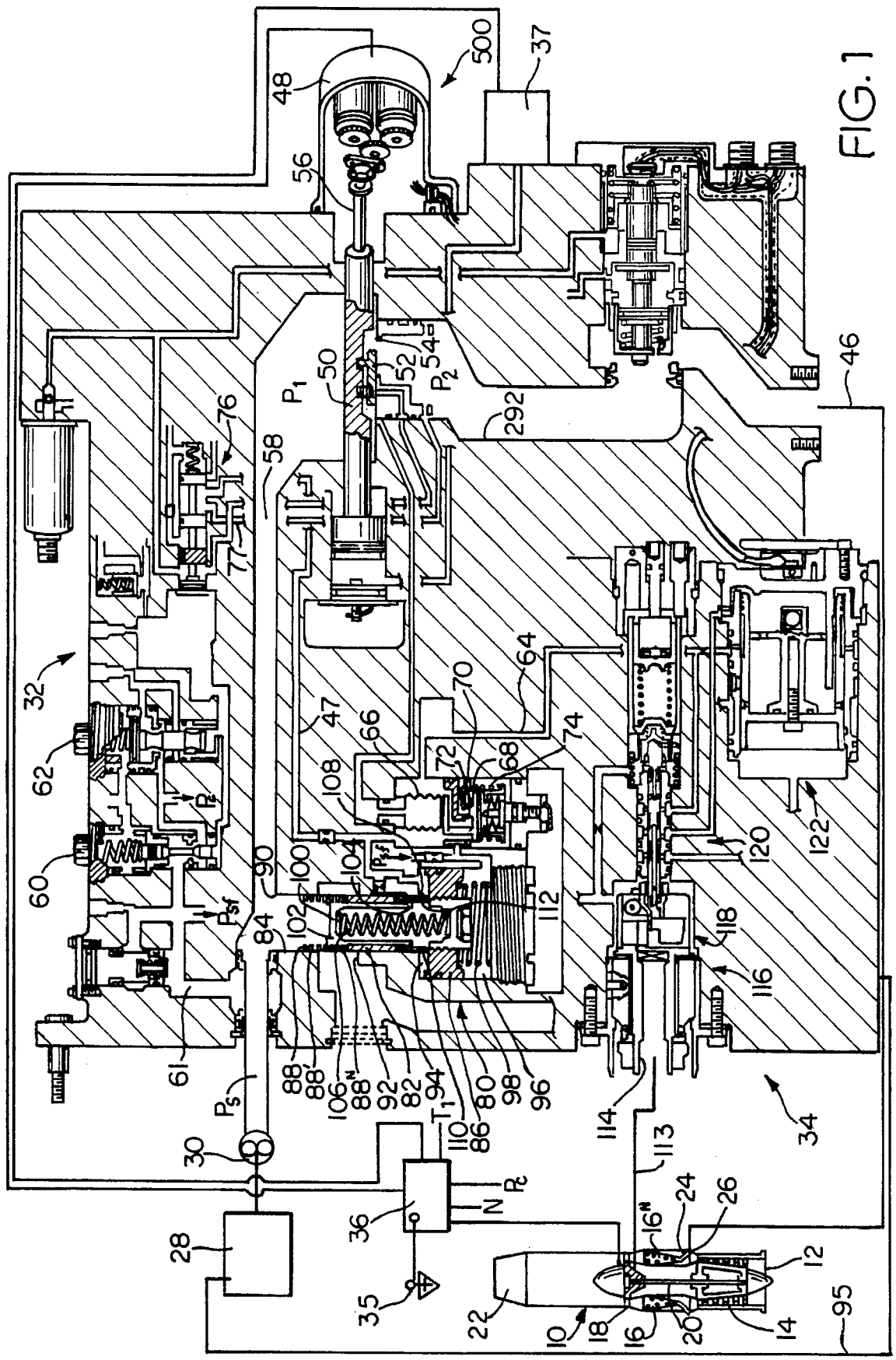
FIG. 1 is a schematic representation of a fuel management system for a turbine having a mechanical governor made according to the present invention to prevent an overspeed condition in the turbine.

A conventional gas turbine engine 10, shown in FIG. 1 and similarly disclosed in U.S. Pat. No. 4,835,969, has an air inlet 12, an air compressor 14, a plurality of combustion chambers 16, 16$^n$, a gas turbine 18 connected by as shaft 20 to drive compressor 14, and exhaust nozzle 22 through which products of combustion are expelled to the atmosphere. A plurality of fuel injection nozzles 24, only one of which is illustrated, connected to a fuel manifold 26 are adapted to inject metered pressurized fuel into the combustion chambers 16, 16$^n$ where a resulting air fuel mixture is burned to generate hot motive gases that passes through turbine 18 to rotate compressor 14 and produce a thrust on exiting nozzle 22 to the surrounding atmosphere.

A fuel management system 32 includes an electronic sensing and signal computer 36 which supplies a fuel metering valve 500 with an operation input and a hydromechanical governor control 34 to control the communication of fuel from an engine driven positive displacement pump 30. The fuel management system 32 supplies manifold 26 with fuel from tank 28 as a function of the fuel metering valve 500 and input supplied from computer 36.

The electronic sensing and signal computer 36 receives electrical input signals representing selected variable conditions corresponding to the current operation of the engine 10 as, for example, engine speed N, compressor discharge air pressure $P_c$, the position of the power lever 35, compressor inlet air temperature Ti, and other engine temperatures. The electrical input signals as sensed are compared electronically in computer 36 and an operational signal is thereafter supplied to operate the electrohydraulic servovalve 37 and resolver 48 to position fuel metering valve 50 to control the flow of fuel to manifold 26 by way of conduit 46.

Resolver 48 rotates when a stem 56 of the fuel metering valve 50 is moved to position a flat plate 52 attached to stem 56 with respect to a triangular shaped port 54 to control the communication of fuel from conduit 58 to conduit 46.

A portion of the supply fuel, having a fluid pressure $P_s$, from pump 30 is diverted through conduit 61 to a servo regulator valves 60 and 62 to provide operational fluid having a substantially constant fluid pressure $P_c$ for operating the fuel management system while the supply fuel that is presented to the fuel metering valve 50 now has a fluid pressure $P_1$. The restriction of flow of fuel through port 54 reduces the fluid pressure in the operational fuel such that the fluid pressure as supplied to manifold 26 has a fluid pressure of $P_2$.

It is established that the rotation of shaft 20 in turbine 10 is a direct function of the position of plate 52 with respect to port 54 and the pressure differential $P_1-P_2$ of the fuel developed across plate 52. In order to assure operation of the turbine this pressure differential should remain substantially constant.

In order to maintain this constant pressure differential, a head sensor 64 and by pass valve 80 control the fluid pressure differential between $P_1$ and $P_2$.

The head sensor 64 includes a bellows 66 which receives the fluid pressure $P_1$ from the fuel metering valve 50 and acts on a movable member 68. Movable member 68 has a face 70 which is urged toward a seat 72 by an adjustable spring 74 and the fluid pressure $P_2$ which is communicated from conduit 46 by way of conduit 47 connected to shut off valve 76.

The bypass valve 80 which is connected to the head sensor 64 has a sleeve 82 located in a bore 84 and connected to an integrator piston 86 which separates a $P_2P$ chamber 94 from a $P_x$ reference chamber 96. Chamber $P_2P$ is designed to receive fluid pressure $P_2$ which is communicated through a restrictor after passing through conduit 77, shut off valve 76 and conduit 47 while the reference chamber is designed to receive reference fluid pressure $P_x$ developed by head sensor 64. Sleeve 82 has a series of openings 88,88'...88n located adjacent an end thereof to control communication from bore 84 to port 92 in return conduit 95 connected to the fuel tank 28. A spring 98 in chamber 96 and the fluid pressure in chamber 61 act on and urge integrator piston 86 toward chamber 94 in opposition to the fluid pressure $P_2P$ in chamber 94. A proportional piston 100 located in sleeve 82 has a face 102 on one side and a lip 104 on the other end. The fluid pressure $P_2P$ in chamber 94 is communicated to the interior of sleeve 82 by openings 110 and 112 and spring 106 is located between the integrator piston 86 and the proportional piston 100 act on proportional piston 100 to urge lip 104 toward a shoulder 108 on sleeve 82 in opposition to the fluid pressure $P_1$ in the supply fuel present at port 90 in conduit 58. Depending on the fluid pressure $P_2P$ acting on integrator piston 86, sleeve 82 moves to provide communication fro bore 84 through openings 88, 88'...88" to return 95 through port 92. At the same time, the pressure differential between the fuel supply $P_1$ and the fluid pressure $P_2P$ acting on piston 100 move face 102 to define the number of openings 88, 88'...88" through which fuel from the supply may flow to the return conduit 95.

The rotation of shaft 20 as a result of the fuel supplied to turbine 10 is communicated through flexible conduit 113 to shaft 114 in the mechanical governor 116.

The mechanical governor 116, which includes a flyweight speed mechanism 118, a first or slidable spool valve assembly 120 and a second or integrator valve assembly 122, responds to the rotation of shaft 20 to prevent an overspeed condition from occurring during the operation of the fuel metering valve 500 in response to an input from the computer 36.

The flyweight speed mechanism 118 provides an input to the slidable spool valve assembly 120 as a function of the rotation of shaft 114 corresponding to the rotation of shaft 20 in the turbine 10. Rotation of shaft 114 causes the weight 123 to pivot about pin 124 and provide an axial force through connection 126 to the cylindrical spinning spool 128 in the slidable spool valve assembly 120.

The cylindrical spinning spool 128 of the slidable spool valve assembly 120 is located in a bore 130 of housing 132. The cylindrical spinning spool 128 has a first end 134 with a flange 136 thereon and a second end 139 for receiving an axial input from connection 126. Cylindrical spinning spool 128 has at least first 138, second 140 third 142 and fourth 144 lands and corresponding first 146, second 148 and third 150 grooves located between flange 136 and the second end 139. The cylindrical spinning spool 128 has a first bore 152 with a radial bore 154 which connects groove 148 to return 95 by way of port 156 in bore 130 and a second bore 158 with a radial bore 160 which connects groove 150 to return 95 by way flowing across face 133 to port 162 in bore 130. A sleeve 164 located in bore 130 surrounds the cylindrical spinning spool 128. Sleeve 164 has a flange 166 which engages a shoulder 168 in the housing 132 for aligning a first communication groove and radial opening 170 with a port 172 in housing 132, a second communication groove and radial opening 174 with a port 176 in housing 132 and a third communication groove and radial opening 180 with a port 182. Port 172 is connected to receive regulated fluid pressure $P_c$, port 176 is connected by conduit 178 to integrator valve assembly 122 while port 182 is connected by conduit 184 to integrator valve assembly 122 and to head sensor 64 to receive fluid pressure $P_2P$. A spring 186 located in bore 130 urges flange 166 into engagement with shoulder 168 to maintain communication grooves and radial openings 170, 174 and 180 in alignment with ports 172, 176 and 182. Spring 186 is positioned in bore 130 by sleeve 190. The location of a seat 196 on sleeve 190 in bore 130 is established by adjustment member 194 retained in end cap 195 to define a stop for a seat member 198 located in bore 130. Sleeve 190 has a series of slots 192 located in the end thereof as best shown in FIG. 5 for receiving pins 202 that radiate from a spring guide or projection 206 of bearing retainer member 204. Pins 202 maintains the bearing retainer member 204 in substantially the axial center of bore 130 such that radial forces induced by positioning orientation from sleeve 190 are substantially eliminated from any axial forces transmitted to the cylindrical spinning spool 128. Bearing retainer member 204 has a projection or spring guide 206 on one end and a cylindrical ring 208 on the other end. Cylindrical ring 208 is made of a carbon material and forms an engagement surface for the face 133 of the first end 136 of cylindrical spinning spool 128. A spring 210 which surrounds guide 206 is retained between the seat member 198 and bearing retainer member 204 for urging cylindrical ring 208 toward face 133 such that a gap 212 is formed between the end of the spring guide 206 and the seat member 198.

A piston 214, which is positioned in sleeve 190 by an adjustment member 216, retains a spring 218 which urges seat member 198 into engagement with seat 196 to define the location of a first stop position associated with the first mode of operation of the spool valve assembly 120. A compensation arrangement 220 which includes bi-metal washers 222 and piston 224 is located between adjustment member 216 and piston 214 to provide compensations for changes in temperature which may effect the operation of the accuracy of the slidable spool valve assembly 120.

Figure 2:
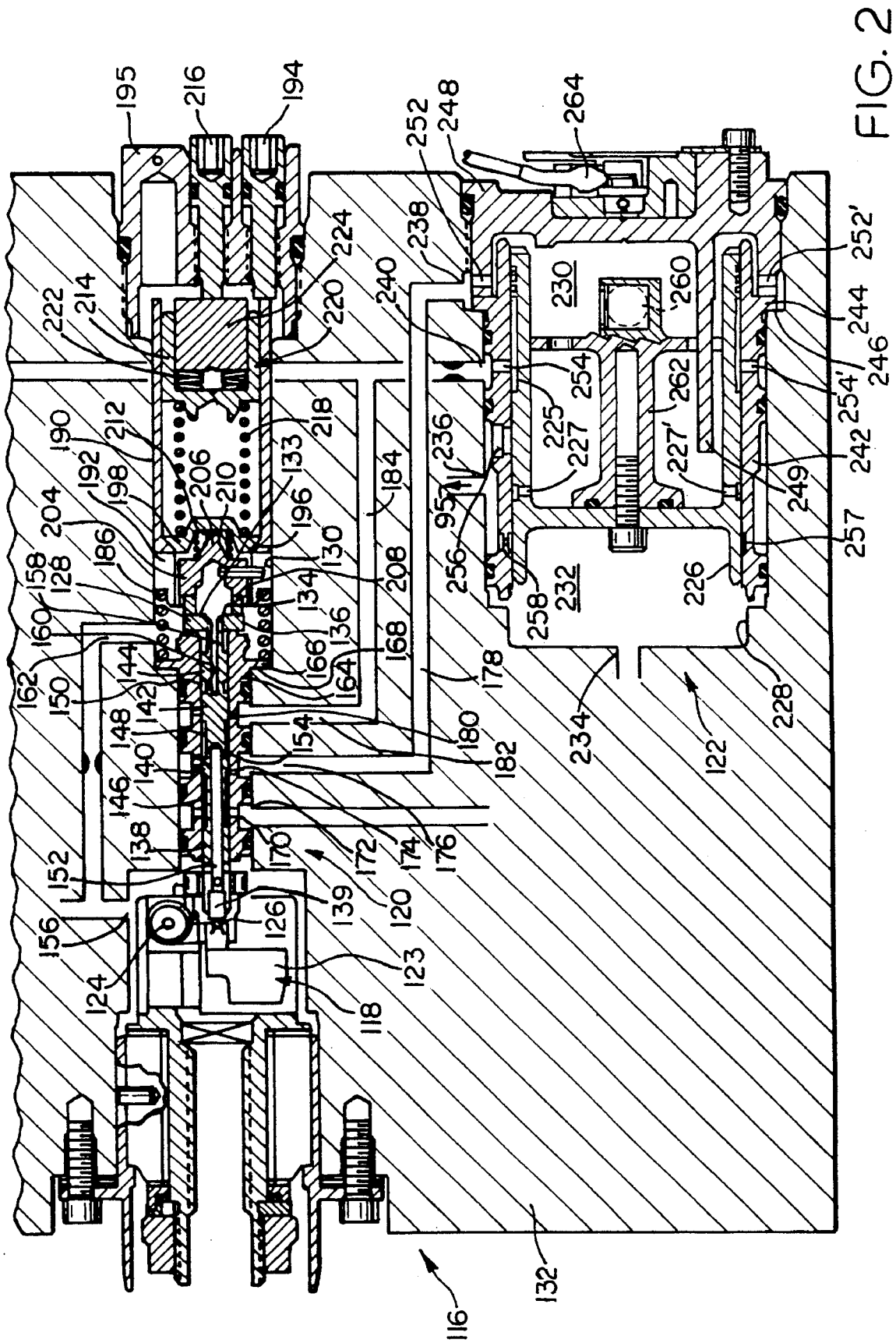
FIG. 2 is an enlarged view of the mechanical governor of FIG. 1.

The integrator valve assembly 122 has a pressure responsive piston 226 located in a bore 228 for defining a first chamber 230 and a second chamber 232 within housing 132. Bore 228 has a port 234 connected to receive regulated fluid pressure $P_{cr}$, a port 236 connected to the return 95 to be at the fluid pressure $P_{cb}$ of the body ($P_{cb}$ being slightly greater than the fluid pressure of the fluid pressure of the return in conduit 95), a port 238 connected to conduit 178 to receive fluid pressure $P_x$ derived from the control fluid pressure $P_c$ as defined by the position of the cylindrical spinning spool 128 within sleeve 164 and port 240 connected to conduit 184 connected to the head sensor 64 and port 182 of the slidable spool valve assembly 120 for receiving fluid pressure $P_2P$. A sleeve 242 located in bore 228 has a flange 244 that is positioned against shoulder 246 by an end cap 248 attached to housing 132. End cap 248 has a series of radial openings 252, 252' through which port 238 is connected to the first chamber 230 while sleeve 242 has a first series of radial openings 254, 254' that connects port 240 with a groove 225 on the peripheral surface of piston 226, a second radial opening 256 and a third radial opening 258. Piston 226 has a plurality of radial openings 227, 227' that are alignable with a groove 257 connectable with radial opening 258 in sleeve 242. A sensor actuation member or magnet 260 has a carrier 262 which is attached to and moves with piston 226 within bore 228. A projection 249 that extends from end cap 248 engages the carrier 262 to hold piston 226 from rotating within the bore 228 to align the magnetic lines of flux therein with a reed switch assembly 264 retained in end cap 248 as best shown in FIG. 2 even after repeated axial movement within bore 228. A reed switch 264 provides computer 36 with information relating to the movement of piston 226 within bore 228.

An operator moves or positions power lever 35 to provide the electronic computer 36 with an input of a desired operation for the turbine 10. This input along with other operating parameters such as atmospheric air pressure, compressor discharge pressure, engine speed, inlet air temperature, altitude and engine temperature are evaluated in developing an operational signal that is supplied to the fuel metering valve 500 for moving fuel metering valve 50 to define an opening for port 54 to allow fuel to flow from conduit 58 to conduit 46 for distribution to fuel manifold 26. The fuel supplied to the fuel manifold 26 is communicated to and burned in chamber 16 causing an expansion of the gases therein when on exiting nozzle 22 rotates shaft 20. The rotation of shaft 20 is directly proportional to the fuel supplied to manifold 26. The restriction of the flow of fuel through port 54 causes a pressure drop to occur across the fuel metering valve 50 such that the fuel in conduit 58 has a fluid pressure $P_1$ and the fluid in conduit 46 has a fluid pressure $P_2$.

Fluid pressure $P_1$ is communicated through conduit 65 to bellows 66 of the head sensor 64 while fluid pressure $P_2P$ (fluid pressure $P_2$ as modified by flowing through a fixed bleed) is presented to the outside of bellows 66. The resulting pressure differential acts on movable member 68 and positions face 70 against seat 72 to prevent communication of operational fluid having a fluid pressure $P_s$ to chamber 75. At the same time, fluid pressure $P_2P$ is communicated to chamber 94 in bypass valve 80 to act on both integrator piston 86 and proportional piston 100 to position sleeve 82 and lip 103 with respect to port 92 to establish a corresponding size for the opening to return conduit 95. The integral piston 86 which is controlled by the head sensor 64 holds the pressure drop across bellows 66 and fuel metering valve 50 substantially constant.

Rotation of shaft 20 is communicated to the mechanical governor 116 by flexible shaft 113 which provides a rotary input to shaft 114 of the flyweight speed mechanism 118. As shaft 114 rotates weight 123 pivots about pin 124 an axial force develops which is communicated to cylindrical spinning spool 128 of the spool valve assembly 120 through connection 126. Spring 210 opposes the axial force applied to move cylindrical spinning spool 128. A designed flow leak develops in bore 130 from port 182 and to port 162 as fluid pressure $P_2P$ is greater than the fluid pressure $P_{cb}$. This flow leak is directed along a path defined by communication groove and radial opening 180, radial port 150 and axial bore 158. This communication of fluid maintains a flowing fluidic film across face 133 between cylindrical ring 208 and face 133 on flange 134 to extend the life of this dynamic coupling. At some rotational speed for shaft 20, the resulting developed axial force overcomes spring 210 and moves the end of spring guide 206 into engagement with seat member 198 to eliminate the gap 210 formed therebetween. With spring guide 206 seated on seat member 198, control pressure $P_c$ is communicated to integrator valve 122 by way of port 172, groove and radial opening 170, groove 146, groove and radial opening 174, port 176, and conduit 178. In this position, control pressure $P_c$ as presented to conduit 178 is restricted such that the fluid pressure presented to chamber has a fluid pressure $P_x$. With fluid pressure $P_x$ present to chamber 230 a pressure difference overcomes the fluid pressure $P_{cr}$ in chamber 232 and moves piston 226 to a position as illustrated in FIG. 3.

With fluid pressure $P_x$ in chamber 230, piston 226 remains substantially in the position shown in FIG. 3 as long as the force applied to the cylindrical spinning spool 128 is less than the spring force of spring 218, maintaining fluid pressure $P_x$ at the same fluid pressure as fluid pressure $P_{cr}$. When the axial force developed by the movement of weight 123 about pin 124 from the rotation of shaft 114 reaches a predetermined axial force, typically such axial force is set to correspond to 106% of the optimum rotation of shaft 20 of turbine 10, spring 218 is overcome and cylindrical spinning spool 128 moves in a manner as illustrated in FIG. 4. In this mode of operation, communication of control pressure $P_c$ from port 172 to port 176 and conduit 178 is less restricted such that fluid pressure $P_x$ increases to $P_{x'}$. This increased fluid pressure $P_{x'}$ is presented to chamber 230 of integrator valve assembly 122. Piston 226 responds to fluid pressure $P_{x'}$, and moves toward chamber 232 to first communicate port 240 into communication with port 236 and the return 95 by way of radial openings 254, 254', groove 225, and radial opening 256 and later communicates chamber 230 to port 236 and return 95 by way of radial openings 227, 227' groove 257 and radial opening 258. Port 236 which is at body pressure $P_b$ rapidly reduces the fluid pressure $P_2P$ as port 256 is sized for relatively unrestricted flow from port 240. However a restriction 183 is located in conduit 179 that connects port 240 to conduit 178 to control the flow of fluid to port 236 such that the change in fluid pressure $P_2P$ as presented to bellows 66 in head sensor 64 and chamber 94 while reduced to allow additional fuel to flow from the supply to the return by way of port 92 connected to conduit 95 is smooth.

In the overspeed condition, as illustrated in FIG. 4, communication of fluid with fluid pressure $P_2P$ to body pressure occurs more easily through the spool valve assembly 120 since groove 148 is aligned with radial bore 180 and bore 152 to directly communicate port 182 to port 162. As the fluid pressure $P_2P$ is reduced and more fuel is communicated to the return conduit 95 the pressure differential across the fuel metering loop port 54 is reduced, less fuel is supplied to manifold 26 such that a reduction in rotation of turbine shaft 20 occurs. Upon activation of the overspeed governor system, the shaft 20 rotation speed is maintained at a predetermined set point by a balance established between the input applied to the cylindrical spinning spool 128 as a result of the rotation of shaft 114 and the resistance to this input by spring 218 to define $P_2P$. The initial reduction in rotation of shaft 20 is directly communicated to the mechanical governor 116 by way of flexible shaft 113 and the axial force produced by the rotation of weight 123 is reduced and spring 218 moves the cylindrical spinning spool 128 to reposition the communication of fluid having fluid pressure $P_c$ from port 172 to port 176 is restricted and fluid press $P_x$ develops as illustrated in FIG. 3. When cylindrical spinning spool 128 returns to the position illustrated in FIG. 3, the fluid pressure $P_x$ in chamber 230 is reduced allowing the regulated control pressure $P_{cr}$ to reposition piston 226 such that communication of fluid pressure $P_2P$ is regulated to maintain a substantially constant shaft 20 rotation. If the rotation of shaft 20 changes from the predetermined governed set point, the axial forces exerted on cylindrical spinning spool 128 and spring 218 by the movement of weight 123 pivoting about pin 124 will change the position of the cylindrical spinning spool 128 in a manner that changes fluid pressure $P_x$ in the integrator valve assembly 122 to position piston 126 and maintain the predetermined set point.

It should be apparent that the point, initial communication of fluid pressure $P_x$ to the integrator valve assembly 122 occurs as a function of spring 210 while the communication as a result of an overspeed condition is a function of spring 218. Adjustment of sleeve 190 within bore 130 by adjustment member 194 to set the gap 212 to establish the first position while the preload of spring 218 can be changed by the adjustment member 216 to define the second or overspeed actuation point.

Through the mechanical governor 116, the operation of the turbine 10 is controlled independently of the computer 36 to prevent an overspeed condition from occurring.

We claim:

1. In a fuel management system having a source of supply fuel with a substantially constant fluid pressure $P_s$, said supply fuel being supplied to a fuel metering loop with a fluid pressure $P_1$, said fuel metering loop being responsive to an input from an electronic computer for supplying operational fuel with a fluid pressure $P_2$ to a combustion chamber in an engine, a bypass valve responsive to said fluid pressure $P_2$ to control communication of a portion of said supply fuel having a fluid pressure $P_s$ to a return connected to said source of supply for maintaining a desired fluid pressure differential $P_1-P_2$ across said fuel metering loop corresponding to said input from said electronic computer, a turbine responsive to the combustion of the operational fuel in said combustion chamber by rotating to drive a compressor in said engine and mechanical governor means responsive to a rotation of said turbine above a predetermined rotation for lowering the pressure differential $P_1-P_2$ across said fuel metering loop by allowing operational fluid to flow to said return and thereby change the fluid pressure $P_2$ presented to said bypass valve to a fluid pressure $P_2P$ with additional supply fuel being communicated to said return such that the desired pressure differential $P_1-P_2$ decreases so that fuel supplied to said combustion chamber is reduced to prevent an overspeed condition in said turbine even though the input applied to operate the fuel metering loop by said electronic computer does not change, said mechanical governor means being characterized by a first valve having a housing with a bore therein, said housing having a first port, a second port, a third port and a fourth port connected to said bore, a cylindrical spinning spool located in said bore having a first end and a second end with at least first, second and third lands and corresponding first and second grooves located between said first end and said second end, seat means located in said bore and urged toward said first end by a first spring, first stop means located in said bore, second stop located in said bore and urged toward said first stop means by a second spring, and actuation means connected to receive signals corresponding to the rotation of said turbine, said actuation means reacting to said signal by acting on and initially moving said cylindrical spinning spool to align said first groove with said first and second ports after overcoming said first spring and moving said first end into engagement with said second stop means to communicate fluid having a fluid pressure $P_x$ to first chamber in an integrator valve assembly, said first chamber being separated from a second chamber by a piston, said second chamber being connected to receive a regulated fluid pressure $P_{cr}$, said integrator valve assembly being connected to said third bore and said bypass valve for receiving fluid pressure $P_2P$ and to said return, said piston being responsive to said fluid pressure $P_x$ by overcoming said regulated fluid pressure and moving toward said second chamber as a function of said fluid pressure $P_x$, said actuation means reacting to predetermined rotation of said turbine by further moving said cylindrical spool after overcoming said second spring to communicate said second groove with said second and third ports to allow fluid having fluid pressure $P_2P$ to be communicated to said first chamber in said integrator valve assembly for moving said piston to communicate fluid having fluid pressure $P_2P$ to the return and thereby lower the fluid pressure $P_2P$ such that additional supply fluid is communicated to said return to prevent said overspeed condition.

2. In a fuel management system having a source of supply fuel with a substantially constant fluid pressure $P_s$, said supply fuel being supplied to a fuel metering loop with a fluid pressure $P_1$, said fuel metering loop being responsive to an input from an electronic computer for supplying operational fuel with a fluid pressure $P_2$ to a combustion chamber in an engine, a bypass valve responsive to said fluid pressure $P_2$ to control communication of a portion of said supply fuel having a fluid pressure $P_s$ to a return connected to said source of supply for maintaining a desired fluid pressure differential $P_1-P_2$ across said fuel metering loop corresponding to said input from said electronic computer, a turbine responsive to the combustion of the operational fuel in said combustion chamber by rotating to drive a compressor in said engine and mechanical governor means responsive to a rotation of said turbine above a predetermined rotation for lowering the pressure differential $P_1-P_2$ across a metering valve in said fuel metering loop by allowing operational fluid to flow to said return and thereby change the fluid pressure $P_2$ presented to said bypass valve to a fluid pressure $P_2P$ with additional supply fuel being communicated to said return such that the desired pressure differential $P_1-P_2$ decreases so that fuel supplied to said combustion chamber is reduced to prevent an overspeed condition in said turbine even though the input applied to operate the fuel metering loop by said electronic computer does not change, said mechanical governor means being characterized by a cylindrical spinning spool valve assembly located in a bore responsive to an operational force derived from the rotation of said turbine wherein in a first mode of operation communication of control pressure $P_c$ to an integrator valve assembly is inhibited by a first spring, in a second mode of operation communication of an operational fluid pressure $P_x$ derived from the control pressure $P_c$ is communicated to said integrator valve assembly after said operational force overcomes said first spring but is restrained by a second spring and in a third mode of operation wherein said operational fluid $P_x$ is increased after the operational force overcomes said second spring and supplied to said integrator valve assembly to allow said fluid pressure $P_2P$ to be communicated to be lowered by allowing flow through the integrator valve assembly such that a reduction occurs in the fuel supplied to said combustion chamber.

3. The fuel management system as recited in claim 2 wherein said integrator valve assembly means includes:

a piston located in a bore and connected to receive said fluid pressure $P_x$, said piston being positioned within said bore as a function of a pressure differential developed across said piston between said fluid pressure $P_x$ and a regulated control pressure $P_{cr}$, said piston moving in response to said third mode of operation to overcome said regulated control pressure and allow both the fluid pressure $P_x$ and fluid pressure $P_2P$ to be simultaneously communicated to the return, said communication of fluid pressure $P_2P$ to said return being restricted to limit the flow of fluid having fluid pressure $P_2P$ from the system.

4. The fuel management system as recited in claim 3 wherein in said third mode of operation a communication flow path is provided through said cylindrical spinning spool valve assembly.

5. The fuel management system as recited in claim 4 wherein said first and second springs are connected with sleeve means and adjustment means to establish the first, second and third modes of operation of said slidable spool valve assembly.

6. The fuel management system as recited in claim 5 further including a bearing retainer member located between first spring and said cylindrical spinning spool valve assembly, said bearing retainer member moving axially in said bore to limit the movement of said cylindrical spinning spool valve assembly to define a position for the cylindrical spinning spool valve assembly to initiate communication of fluid pressure $P_x$ to said integrator valve assembly.

7. The fuel management system as recited in claim 6 wherein said cylindrical spinning spool valve assembly rotates as a function of the rotation of said turbine and said bearing retainer assembly does not rotate.

8. The fuel management system as recited in claim 7 wherein a flowing fluidic film is maintained across an interface between a carbon ring in said bearing retainer assembly and cylindrical spinning spool valve assembly to extend the life of a dynamic coupling developed therebetween.

9. The fuel management system as recited in claim 7 wherein said adjustment means includes temperature compensation means to maintain the first, second and third modes of operation substantially uniform when subjected to varying environmental temperature conditions.

10. The fuel management system as recited in claim 8 wherein said cylindrical spinning spool valve assembly includes a cylindrical member with lands and grooves which are matched with corresponding ports in a housing to communicate the fluid pressure $P_x$ to said integrator valve assembly and said fluid pressure $P_2P$ to the return.

11. The fuel management system as recited in claim 9 wherein said integrator valve assembly includes position sensing means for providing said electronic computer with information relating to the second mode of operation of said cylindrical spinning spool valve assembly.

12. The fuel management system as recited in claim 6 wherein said bearing retainer assembly includes a plurality of pins that are retained in slots in said sleeve means such that any radial forces induced by positioning orientation from said sleeve are substantially eliminated from any axial forces transmitted to said cylindrical spinning spool assembly.

\* \* \* \* \*